US011451109B2

(12) United States Patent  
Tominaga et al.

(10) Patent No.: US 11,451,109 B2  
(45) Date of Patent: Sep. 20, 2022

(54) VEHICLE

(71) Applicant: HONDA MOTOR CO., LTD., Tokyo (JP)

(72) Inventors: Takuro Tominaga, Saitama (JP); Takanori Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 442 days.

(21) Appl. No.: 16/566,318

(22) Filed: Sep. 10, 2019

(65) Prior Publication Data

US 2020/0083777 A1 Mar. 12, 2020

(30) Foreign Application Priority Data

Sep. 12, 2018 (JP) .............................. JP2018-170795

(51) Int. Cl.
    *H02K 5/22*     (2006.01)
    *H02K 7/00*     (2006.01)
    *B60L 15/00*     (2006.01)
    *B60K 1/00*     (2006.01)
    *B60W 10/08*     (2006.01)
    *B60K 17/12*     (2006.01)
    *B60K 1/04*     (2019.01)

(52) U.S. Cl.
    CPC .............. *H02K 5/225* (2013.01); *B60K 1/00* (2013.01); *B60K 17/12* (2013.01); *B60L 15/007* (2013.01);
(Continued)

(58) Field of Classification Search
    CPC ........ H02K 5/225; H02K 7/006; B60K 17/12; B60K 1/00; B60K 2001/001;
(Continued)

(56) References Cited

U.S. PATENT DOCUMENTS 8,479,858 B2 * 7/2013 Kodaira ................. B62D 21/17  
    180/68.5  
8,651,216 B2 * 2/2014 Wakatsuki ............... B60K 1/00  
    180/291

(Continued)

FOREIGN PATENT DOCUMENTS

| CN | 204998322 U | 1/2016 |
| JP | 2009-227083 A | 10/2009 |
| JP | 2012-041010 A | 3/2012 |

OTHER PUBLICATIONS

Jan. 28, 2020, Japanese Office Action issued for related JP Application No. 2018-170795.

(Continued)

*Primary Examiner* — Alex W Mok  
(74) *Attorney, Agent, or Firm* — Paratus Law Group, PLLC

(57) ABSTRACT

A vehicle includes a driving device unit, a frame member supporting the driving device unit, a pair of first mounting portions provided on the frame member and positioned on one side of the driving device unit, and a second mounting portion provided on the frame member and positioned on the other side of the driving device unit. The driving device unit includes a drive device accommodating therein an electric motor, and an electric motor control device which controls the electric motor. The drive device and the electric motor control device are arranged in a horizontal direction. An electrical connection portion electrically connecting the drive device and the electric motor control device is disposed at a joining portion between the drive device and electric motor control device and inside a virtual polygon connecting the at least one pair of first mounting portions and the at least one second mounting portion.

5 Claims, 10 Drawing Sheets

(52) U.S. Cl.
CPC ............ *B60W 10/08* (2013.01); *H02K 7/006* (2013.01); *B60K 2001/001* (2013.01); *B60K 2001/0416* (2013.01)

(58) Field of Classification Search
CPC .... B60K 2001/0416; B60K 2001/0438; B60K 1/04; B60W 10/08; B60L 15/007; B60L 2270/145; Y02T 10/64
USPC .......................................................... 310/71
See application file for complete search history.

(56) References Cited

U.S. PATENT DOCUMENTS

| | | | |
|---|---|---|---|
| 9,174,520 B2* | 11/2015 | Katayama | ................ B60K 1/00 |
| 9,586,543 B2* | 3/2017 | Ukai | ........................ B60K 1/00 |
| 9,630,501 B2* | 4/2017 | Shiba | ........................ B60K 6/48 |
| 10,988,013 B2* | 4/2021 | Chai | ........................ H02K 5/225 |
| 2011/0051371 A1 | 3/2011 | Azuma et al. | |
| 2017/0015185 A1 | 1/2017 | Uranaka et al. | |
| 2018/0105032 A1* | 4/2018 | Oyama | .................... B60K 1/04 |

OTHER PUBLICATIONS

Jun. 16, 2022, Chinese Office Action issued for related CN Application No. 201910855265.2.

* cited by examiner

VEHICLE

CROSS-REFERENCE TO RELATED APPLICATIONS

This application is based on and claims priority under 35 USC 119 from Japanese Patent Application No. 2018-170795 filed on Sep. 12, 2018.

TECHNICAL FIELD

The present invention relates to a vehicle equipped with a driving device unit including an electric motor and an electric motor control device configured to control the electric motor.

BACKGROUND ART

In the electric vehicle of JP-A-2009-227083, a power plant in which an electric motor is accommodated is disposed in a rear space of the vehicle, and the electric motor is driven by electric power of a battery disposed under the floor. The electric motor is connected to the battery via an inverter unit, and a rotational speed or the like of the electric motor is controlled by the inverter unit.

However, JP-A-2009-227083 does not disclose an electrical connection portion electrically connecting the power plant and the inverter unit, and there is a room for improvement in a measure against vibration of the electrical connection portion.

SUMMARY

An aspect of the present invention provides a vehicle capable of alleviating a stress applied to an electrical connection portion due to vibration during traveling of the vehicle.

Solution to Problem

An embodiment of the present invention relates to a vehicle which includes:
a driving device unit;
a frame member configured to support the driving device unit;
at least one pair of first mounting portions provided on the frame member and positioned on one side of the driving device unit; and
at least one second mounting portion provided on the frame member and positioned on the other side of the driving device unit, and
the driving device unit includes a drive device configured to accommodate an electric motor, and an electric motor control device configured to control the electric motor, and
the drive device and the electric motor control device are arranged side by side in a horizontal direction, and
an electrical connection portion electrically connecting the drive device and the electric motor control device is disposed at a joining portion between the drive device and electric motor control device and inside a virtual polygon connecting the at least one pair of first mounting portions and the at least one second mounting portion.

Advantageous Effects of Invention

According to the above embodiment of the present invention, since the electrical connection portion electrically connecting the drive device and the electric motor control device is disposed at a joining portion between the drive device and the electric motor control device and inside a virtual polygon connecting the mounting portions, a stress applied to the electrical connection portion due to vibration during traveling of the vehicle can be alleviated.

DESCRIPTION OF EMBODIMENTS

Figure 1:
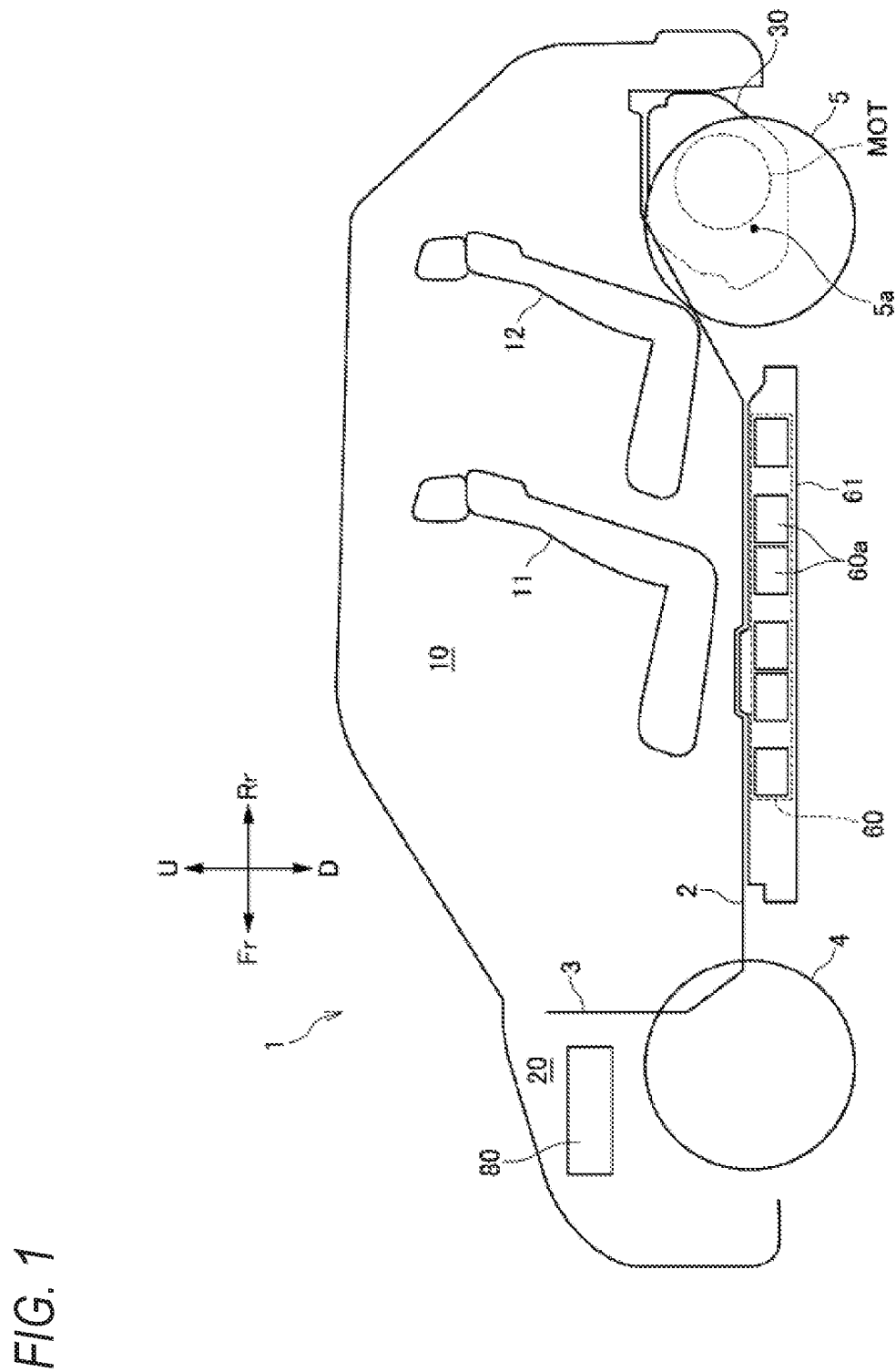
FIG. 1 is a schematic side view showing an overall structure of a vehicle according to an embodiment of the present invention.

Hereinafter, a vehicle according to an embodiment of the present invention will be described with reference to the drawings. Incidentally, the drawings should be seen based on a direction of a reference numeral. In the following description, front, rear, left, right, upper, and lower directions are described according a view from an operator. In the drawings, a front side of the vehicle is denoted by Fr, a rear side is denoted by Rr, a left side is denoted by L, a right side is denoted by R, an upper side is denoted by U, and a lower side is denoted by D.

[Overall Structure of Vehicle]

Figure 2:
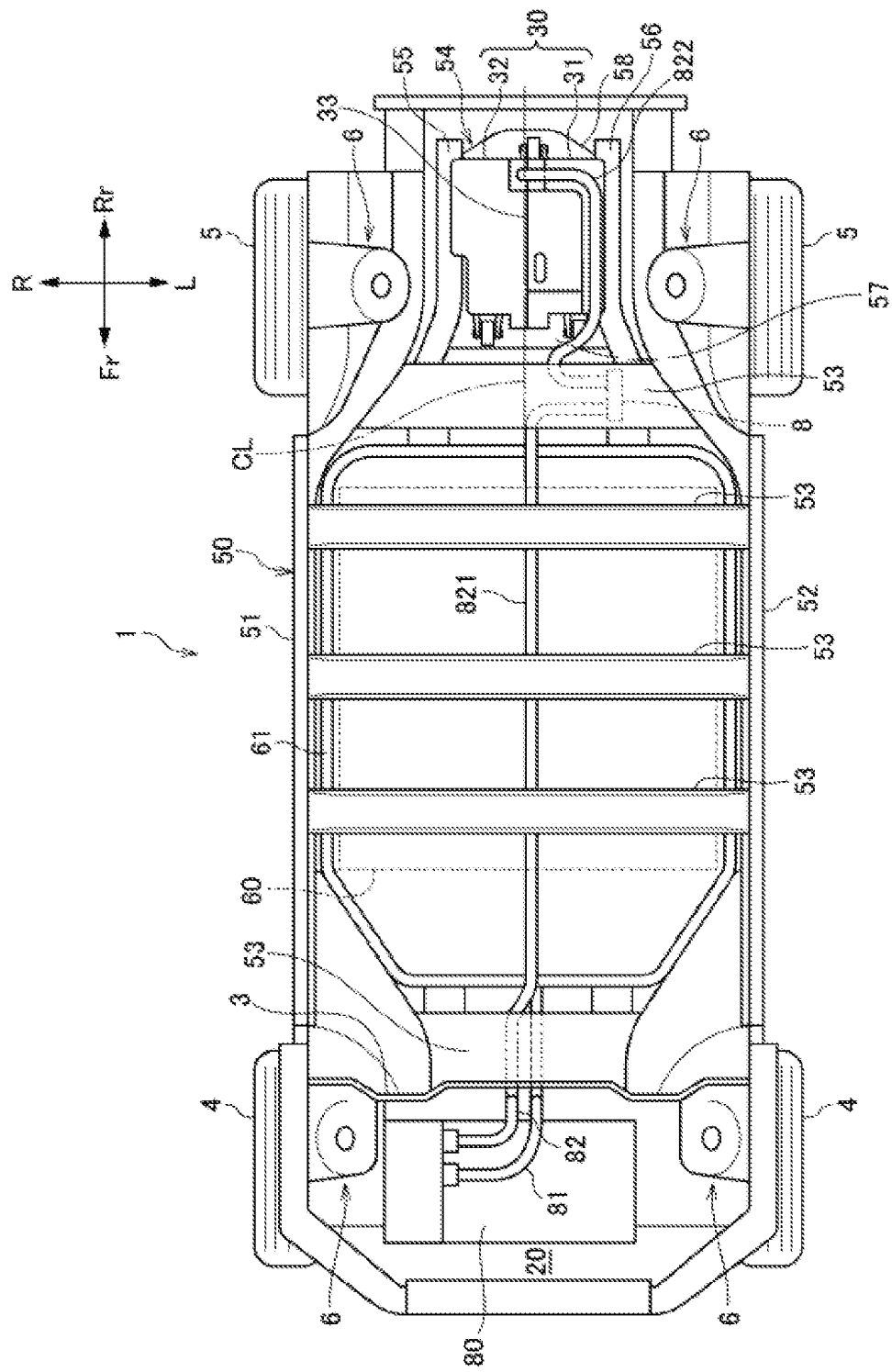
FIG. 2 is a plan view showing an underfloor structure of the vehicle of FIG. 1.

As shown in FIGS. 1 and 2, a vehicle 1 according to an embodiment of the present invention includes a vehicle interior 10 and a front room 20 in front of the vehicle interior 10, which are defined by a floor panel 2 and a dash panel 3. Front seats 11 and rear seats 12 are provided in the vehicle interior 10. A driving device unit 30 as an electric equipment is provided below the floor panel 2 behind the rear seats 12. The driving device unit 30 drives left and right rear wheels 5. That is, in the vehicle 1, the left and right rear wheels 5 are driving wheels, and left and right front wheels 4 are driven wheels. The front wheels 4 and the rear wheels 5 are supported by a vehicle body frame 50 via suspensions (not shown) supported by respective suspension support portions 6.

A battery 60 including a plurality of battery modules 60a is disposed below the vehicle interior 10. The battery 60 is accommodated in a battery case 61 and disposed below the floor panel 2.

The vehicle body frame 50 includes a pair of left and right side members 51, 52 extending in a front-rear direction, a plurality of cross members 53 extending in a left-right direction and connecting the side members 51, 52, and a sub-frame 54 having a rectangular shape so as to surround the driving device unit 30. The sub-frame 54 includes a pair of sub-side members 55, 56 supported by the pair of side members 51, 52, and a front frame member 57 and a rear frame member 58 connecting the pair of sub-side members 55, 56.

[Driving Device Unit]

As shown in FIGS. 2 to 8, the driving device unit 30 is fixed to the rear frame member 58 via a rear mounting portion 542, and is fixed to the front frame member 57 via a pair of front mounting portions 541. The driving device unit 30 includes a drive device 31 which accommodates a motor MOT as an electric motor and a power control unit (PCU) 32 as an electric motor control unit configured to control the motor MOT. The drive device 31 includes a transmission (not shown), and torque of the motor MOT is transmitted to a rear wheel axle 5a via the transmission, and is transmitted from the rear wheel axle 5a to the rear wheels 5.

The drive device 31 and the PCU 32 forming the driving device unit 30 are arranged side by side in a vehicle width direction (horizontal direction) of the vehicle 1, and are joined via a joining portion 33. The joining portion 33 coincides substantially with a center line CL (see FIG. 2) of the vehicle 1 in the vehicle width direction in a plan view.

Figure 3:
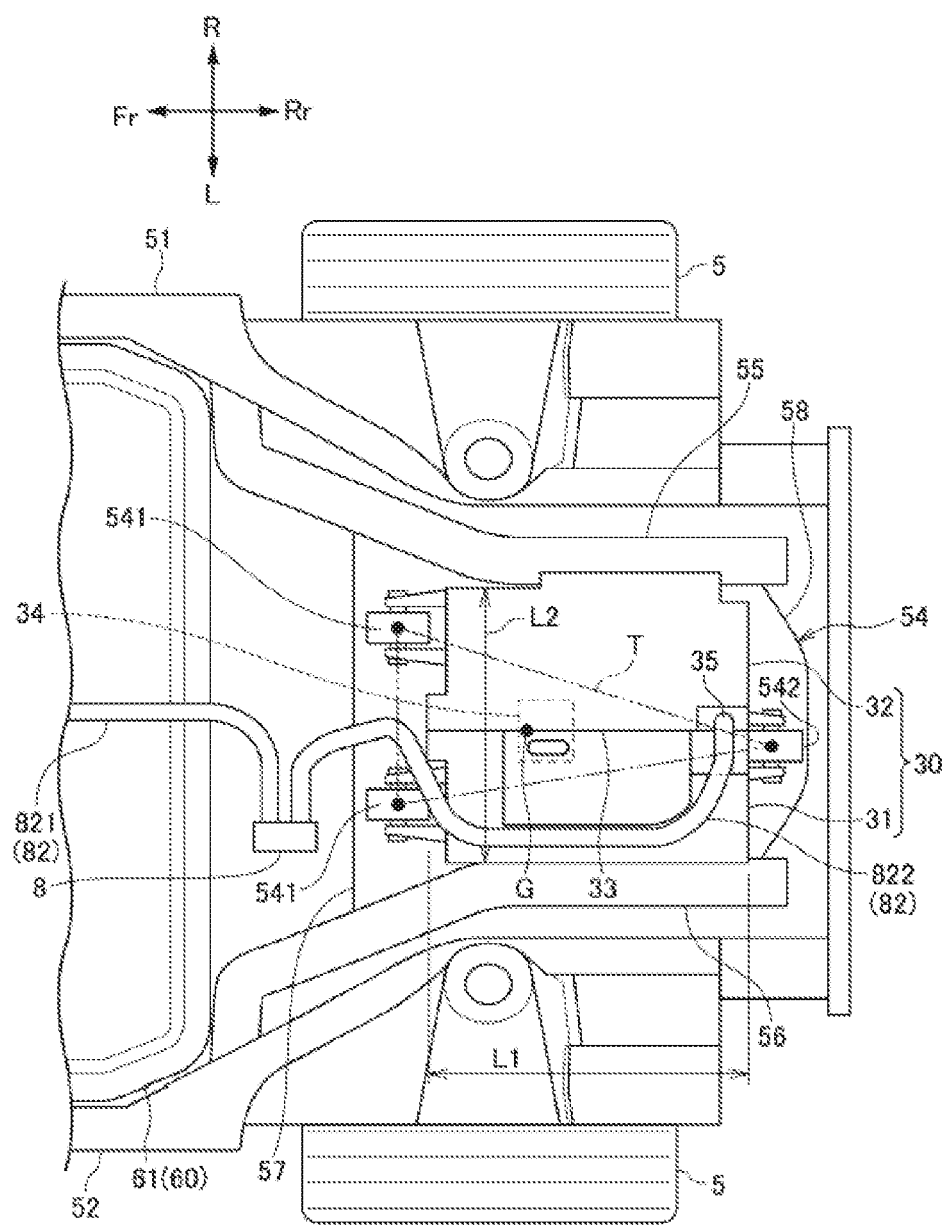
FIG. 3 is a plan view of a driving device unit and a periphery thereof of the vehicle of FIG. 1.
Figure 4:
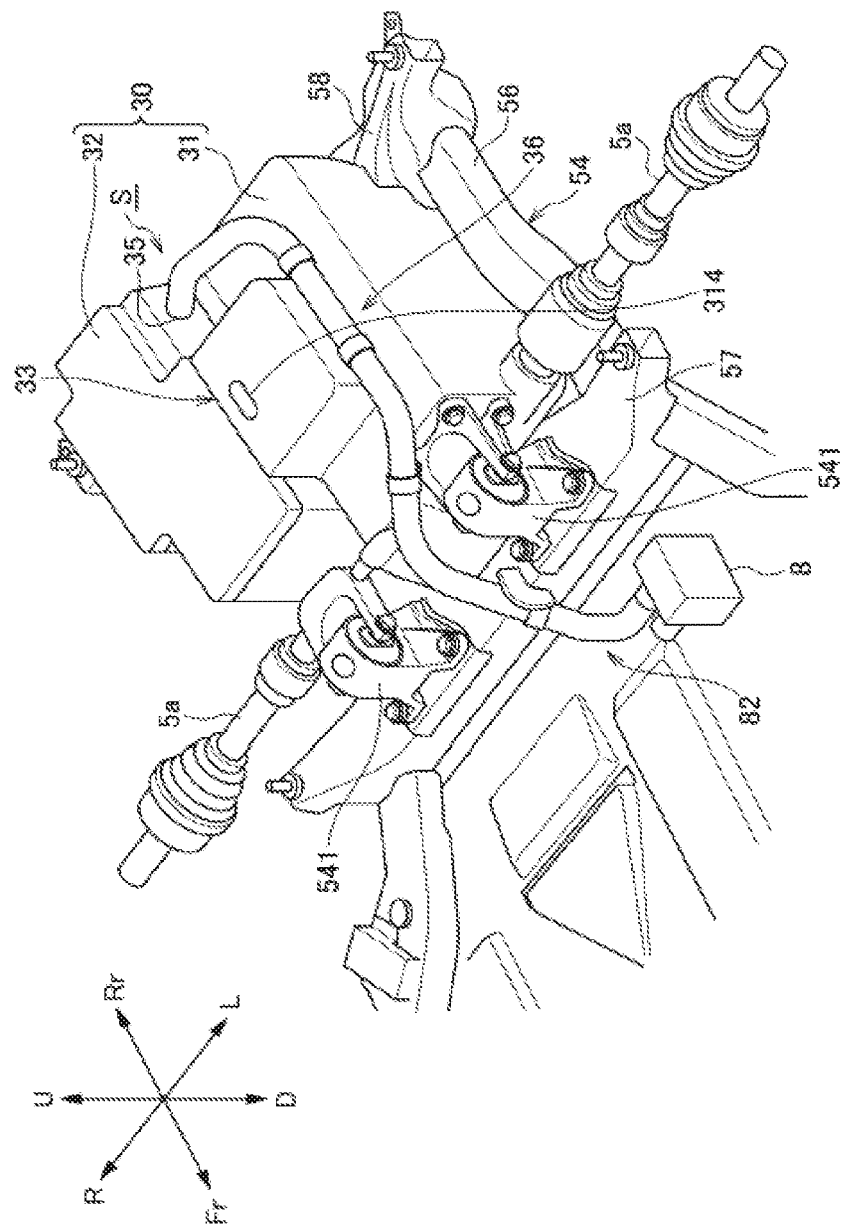
FIG. 4 is a perspective view of the driving device unit and the periphery thereof of the vehicle of FIG. 1.
Figure 5:
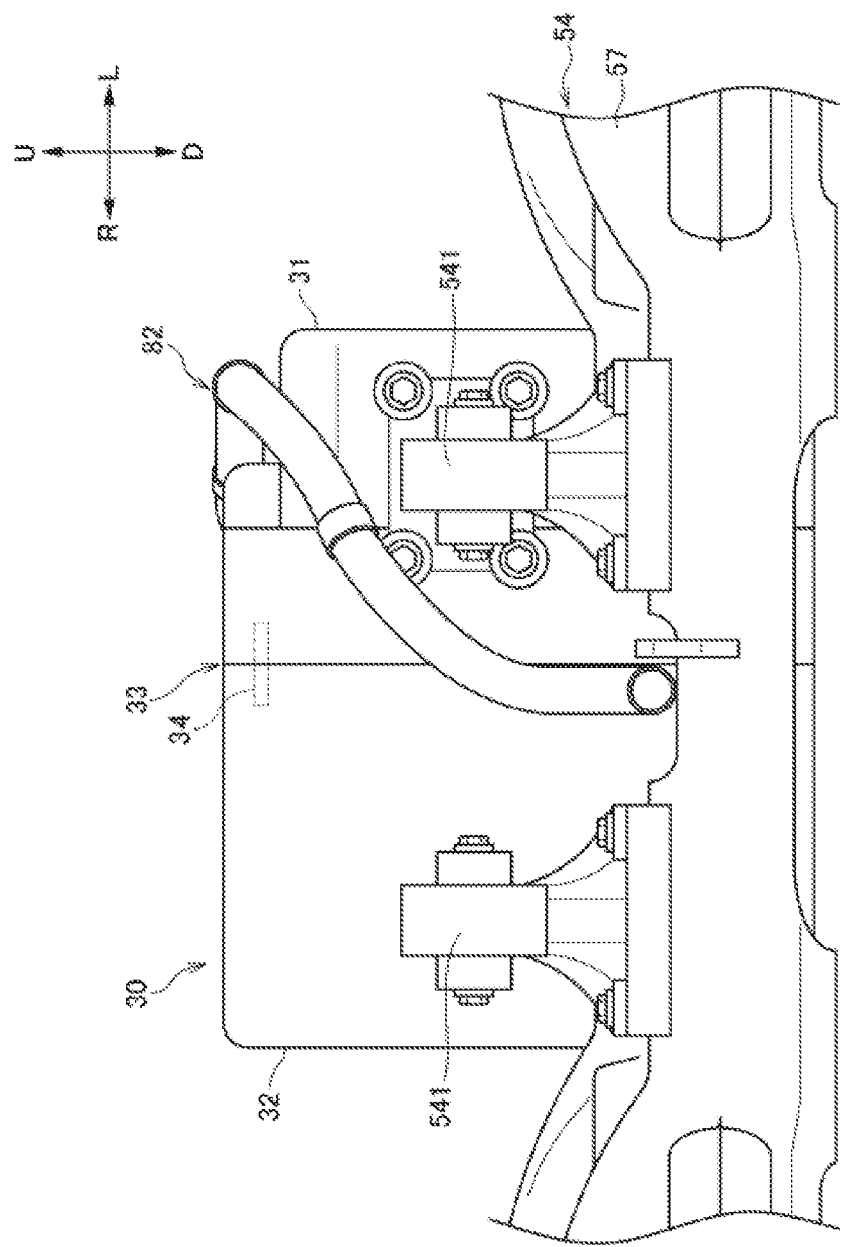
FIG. 5 is a front view of the driving device unit and the periphery thereof of the vehicle of FIG. 1.

As shown in FIG. 3, the driving device unit 30 is configured such that a maximum length L1 in the front-rear direction is longer than a maximum length L2 in the vehicle width direction, and the front mounting portions 541 and the rear mounting portion 542 are disposed in the front-rear direction with the driving device unit 30 interposed therebetween. According to the driving device unit 30, by making the maximum length L1 in the front-rear direction longer than the maximum length L2 in the vehicle width direction, a stress acting by rolling of the vehicle 1 can be alleviated, and with respect to pitching of the vehicle 1, vibration can be suppressed by the front mounting portions 541 and the rear mounting portion 542. Incidentally, the maximum length L1 of the driving device unit 30 in the front-rear direction is a length which does not include brackets of the front mounting portions 541 and the rear mounting portion 542.

As shown in FIG. 2, the driving device unit 30 according to the present embodiment is electrically connected to the battery 60 via a junction box 80 disposed in the front room 20 of the vehicle 1. The junction box 80 is connected to the battery 60 via a battery cable 81, and connected to the PCU 32 via a PCU cable 82. The PCU cable 82 includes a first cable 821 extending from the junction box 80 and a second cable 822 extending from the PCU 32, and the first cable 821 and the second cable 822 are connected to each other via a joint box 8. The second cable 822 is electrically connected to a cable connection portion 35 of the PCU 32 of the driving device unit 30. Battery power (direct current power) supplied from the second cable 822 to the PCU 32 is converted into three-phase alternating current power by an inverter (not shown) provided in PCU 32, and then is supplied to the motor MOT in the drive device 31 via an electrical connection portion 34 electrically connecting the PCU 32 and the drive device 31.

[Electrical Connection Portion]

Figure 9:
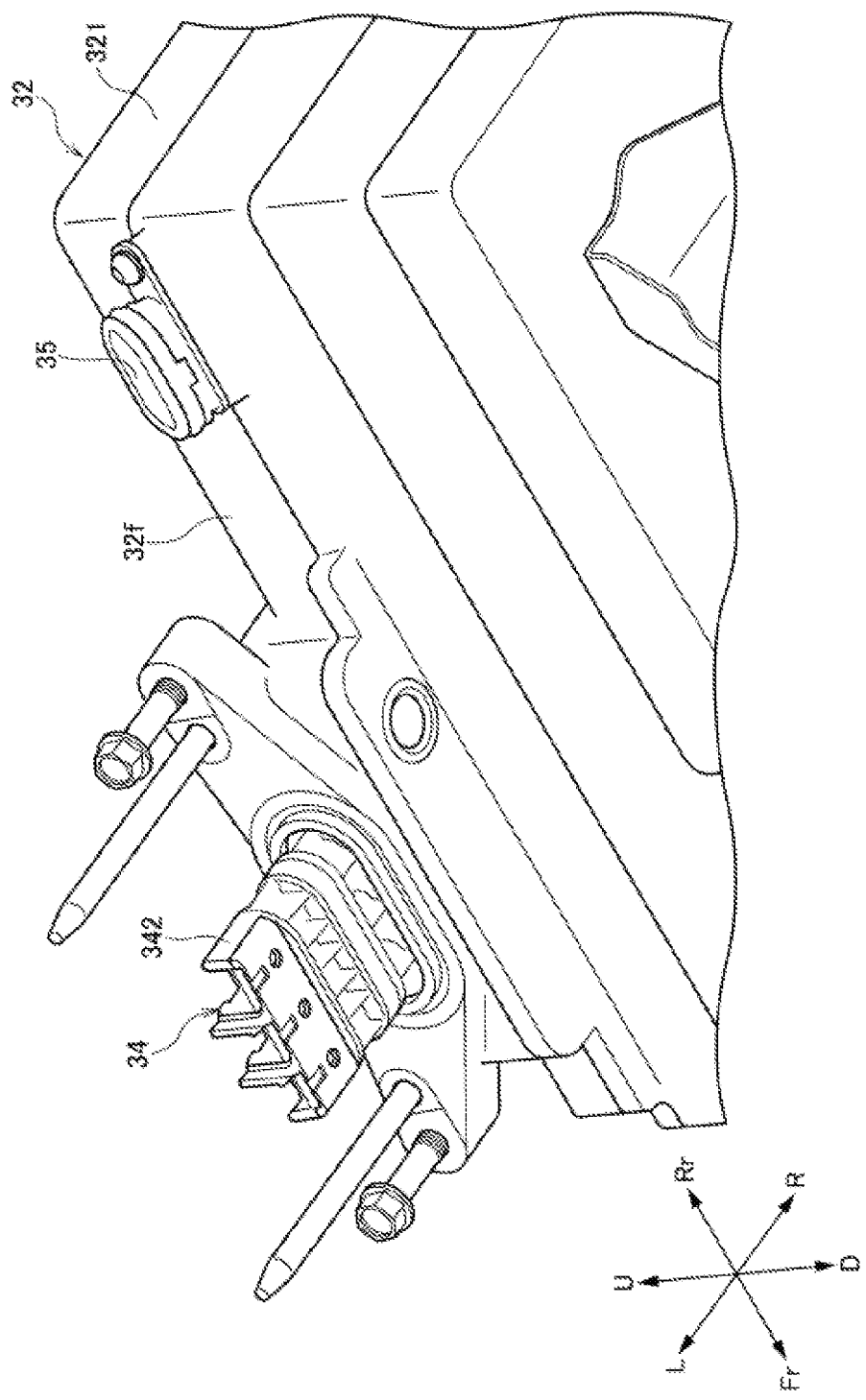
FIG. 9 is a perspective view of a main part of an electrical connection portion of the driving device unit of the vehicle of FIG. 1.
Figure 10:
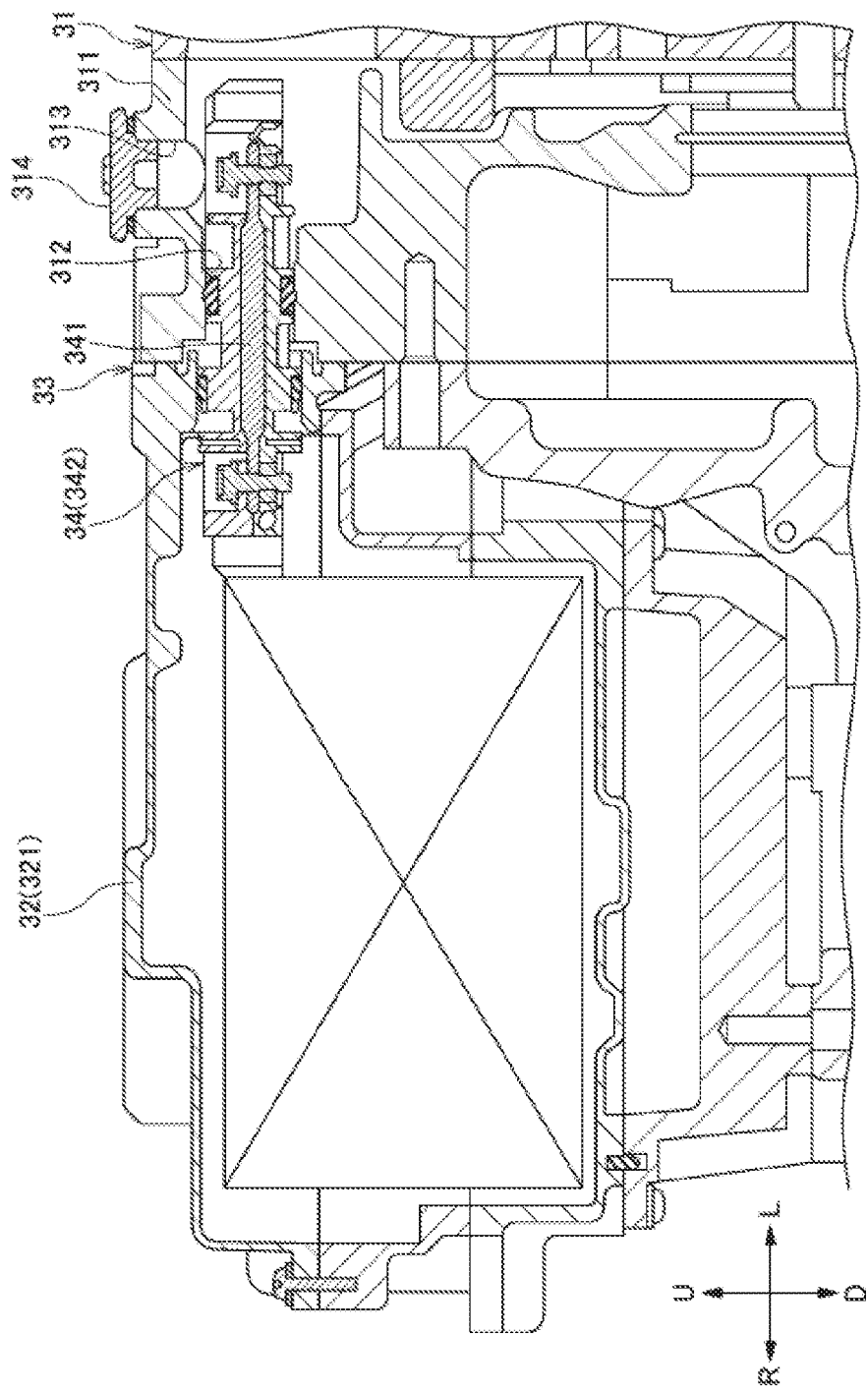
FIG. 10 is a sectional view of the main part of the electrical connection portion of the driving device unit of the vehicle of FIG. 1.

As shown in FIGS. 9 and 10, the electrical connection portion 34 according to the present embodiment includes three bus bars 341 and a holding member 342 which holds the bus bars 341 in an insulated state. The electrical connection portion 34 is attached to a case 321 of the PCU 32 in a state in which the bus bars 341 are electrically connected to the inverter of the PCU 32. As shown in FIG. 9, one end side of the electrical connection portion 34 attached to the case 321 of the PCU 32 is disposed inside the case 321 of the PCU 32, and the other end side thereof protrudes from the case 321 (the joining portion 33) of the PCU 32 in the vehicle width direction. When the PCU 32 is attached to the drive device 31, the other end side of the electrical connection portion 34 is inserted into a recess 312 formed in a case 311 (the joining portion 33) of the drive device 31. The case 311 of the drive device 31 includes a work window 313 which allows the bus bars 341 of the electrical connection portion 34 inserted into the recess 312 to be visibly observed, and a cover 314 which openably and closably closes the work window 313, and an electrical connection work between the bus bars 341 and the motor MOT is performed from the outside of the case 311 via the work window 313. According to the electrical connection portion 34, since the electrical connection portion 34 is provided inside the driving device unit 30 and is not exposed to the outside of the driving device unit 30, the electrical connection portion 34 can be protected from splashing water, flying stones, or the like.

As shown in FIG. 3, in a plan view, the electrical connection portion 34 is positioned at the joint portion 33 between the drive device 31 and the PCU 32, and is disposed inside a virtual polygon T connecting the pair of front mounting portions 541 and one rear mounting portion 542. According to the arrangement of the electrical connection portion 34, a stress applied to the electrical connection portion 34 due to vibration during traveling of the vehicle can be alleviated. In addition, as described above, since the joining portion 33 substantially coincides with the center line CL in the vehicle width direction of the vehicle 1 in a plan view, the stress acting on the electrical connection portion 34 in association with a vehicle behavior can be further reduced.

The position of the electrical connection portion 34 substantially coincides with a center of gravity G of the virtual polygon T in a plan view. According to the arrangement of the electrical connection portion 34, the stress applied to the electrical connection portion 34 due to the vibration during traveling of the vehicle can be further alleviated. Incidentally, the virtual polygon T according to the present embodiment is a triangle, and the center of gravity G of the virtual polygon T, which is a triangle, is an intersection point of three line segments (midline) connecting vertices of the triangle and midpoints of opposite sides. The term "substantially coincide" means that at least a part of the three bus bars 341 and the holding member 342 overlaps with the center of gravity G.

Figure 7:
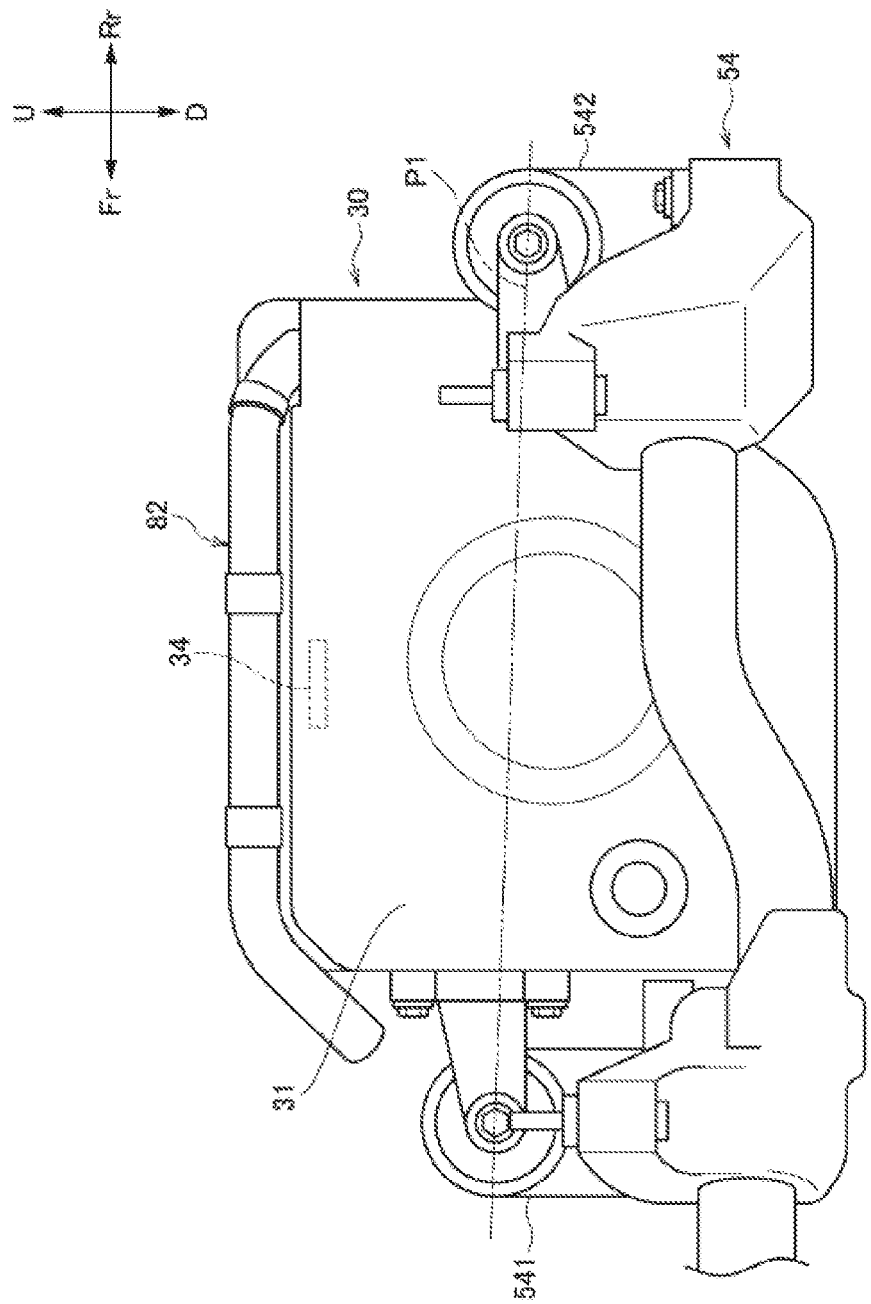
FIG. 7 is a left side view of the driving device unit and the periphery thereof of the vehicle of FIG. 1.
Figure 8:
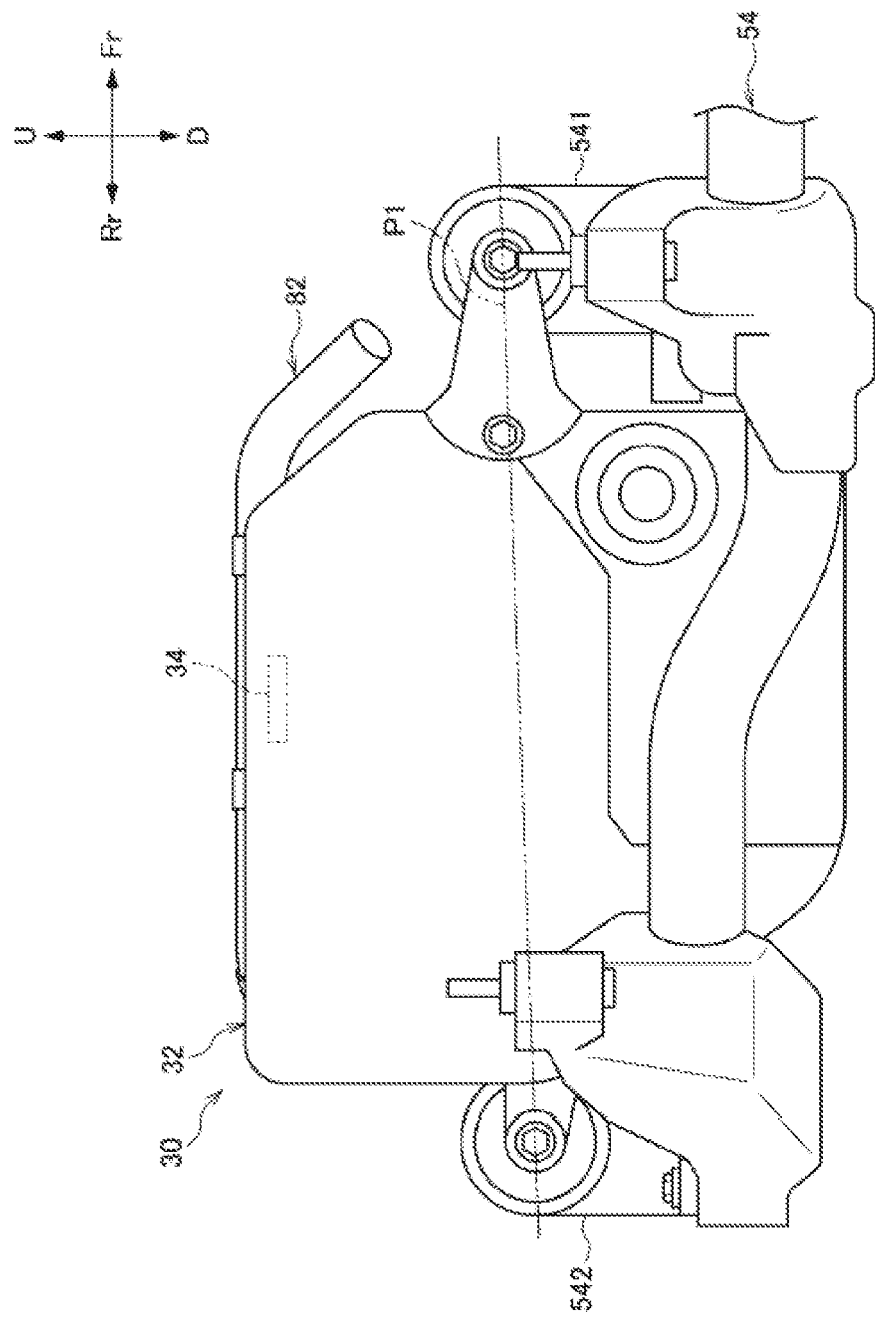
FIG. 8 is a right side view of the driving device unit and the periphery thereof of the vehicle of FIG. 1.

As shown in FIGS. 1, 7, and 8, the upper side of the driving device unit 30 is covered by the floor panel 2, and the electrical connection portion 34 of the driving device unit 30 is disposed above a virtual line P1 connecting the front mounting portions 541 (support center point of the front mounting portion 541) and the rear mounting portion 542 (support center point of the rear mounting portion 542) in a side view. According to the arrangement of the driving device unit 30 and the electrical connection portion 34, the electrical connection portion 34 can be protected from plashing water, flying stones, or the like.

Figure 6:
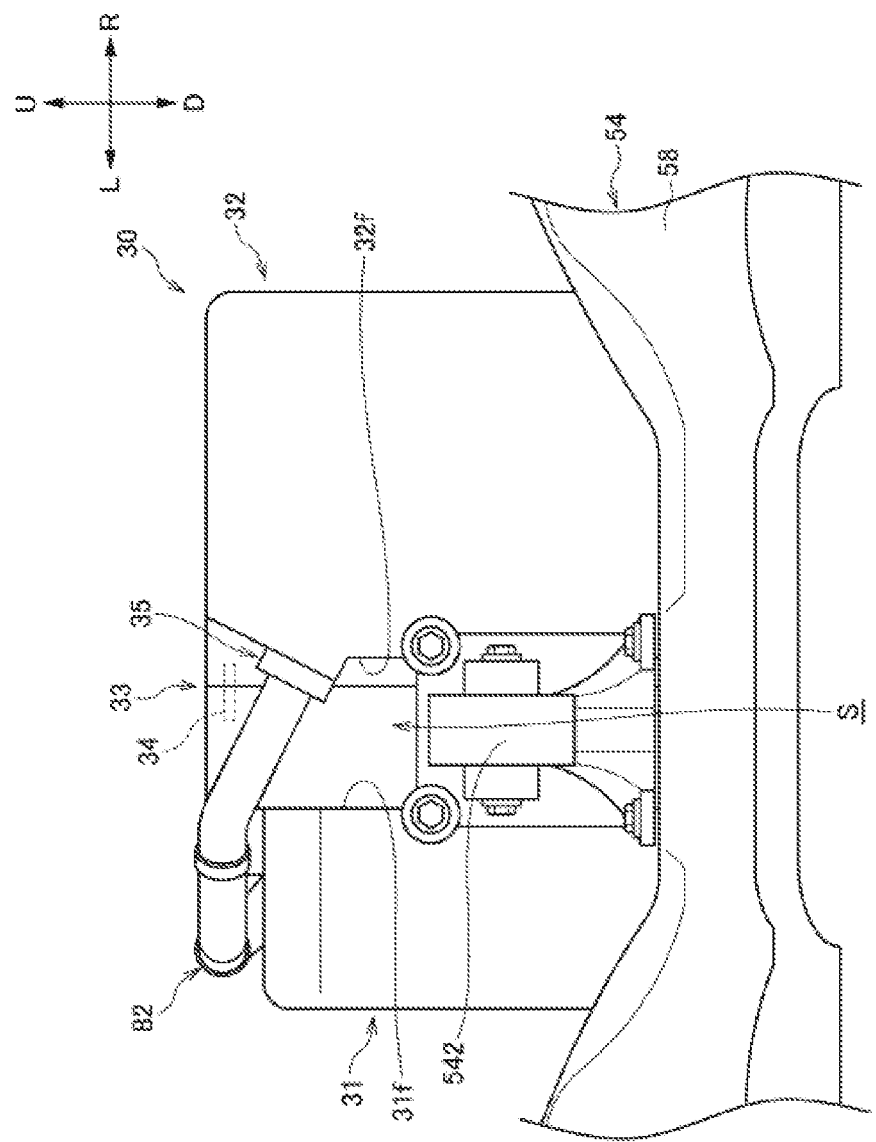
FIG. 6 is a back view of the driving device unit and the periphery thereof of the vehicle of FIG. 1.

As shown in FIGS. 3 and 6, the cable connection portion 35 of the PCU 32 is disposed behind the electrical connection portion 34. More specifically, the cable connection portion 35 is disposed on a facing surface 32f of the PCU 32 in a gap portion S formed between the facing surfaces 31f, 32f of the drive device 31 and the PCU 32 and rearward than the electrical connection portion 34. The cable connection portion 35 is surrounded by a rigid body in three directions, damage at the time of a collision of the vehicle 1 or the like can be avoided. Further, since the cable connection portion 35 is positioned at a distal side farther away from the vehicle interior 10 than the electrical connection portion 34, even if the PCU cable 82 is detached from the cable connection portion 35 at the time of a collision of the vehicle 1 or the like, an influence on the vehicle interior 10 can be reduced.

The above-described embodiment can be appropriately modified, improved, or the like. For example, the number of the front mounting portions 541 and the rear mounting portion 542 is not limited to the number of the front mounting portions 541 and the rear mounting portion 542 according to the above-described embodiment, and for example, the number of first mounting portions may be three or more, and the number of second mounting portions may be two or more.

At least the following matters are described in the present specification. Components or the like corresponding to the above-described embodiment are shown in parentheses, but the present invention is not limited thereto.

(1) A vehicle (vehicle 1) includes:
a driving device unit (driving device unit 30);
a frame member (sub-frame 54) configured to support the driving device unit;
at least one pair of first mounting portions (front mounting portions 541) provided on the frame member and positioned on one side of the driving device unit; and
at least one second mounting portion (rear mounting portion 542) provided on the frame member and positioned on the other side of the driving device unit,
wherein the driving device unit includes a drive device (drive device 31) configured to accommodate an electric motor (motor MOT), and an electric motor control device (PCU 32) configured to control the electric motor,
wherein the drive device and the electric motor control device are arranged side by side in a horizontal direction, and
wherein an electrical connection portion (electrical connection portion 34) electrically connecting the drive device and the electric motor control device is disposed at a joining portion (joining portion 33) between the drive device and the electric motor control device, and inside a virtual polygon (virtual polygon T) connecting the at least one pair of first mounting portions and the at least one second mounting portion.

According to (1), since the electrical connection portion electrically connecting the drive device and the electric motor control device is disposed at the joining portion between the drive device and the electric motor control device and inside the virtual polygon connecting the mounting portions, a stress applied to the electrical connection portion due to vibration during traveling of the vehicle can be alleviated.

(2) In the vehicle according to (1),
the electrical connection portion substantially coincides with a center of gravity (center of gravity G) of the virtual polygon.

According to (2), the stress applied to the electrical connection portion due to the vibration during traveling of the vehicle can be further alleviated.

(3) In the vehicle according to (1) or (2),
the drive device and the electric motor control device are arranged side by side in a vehicle width direction, and a length of the driving device unit in a front-rear direction (maximum length L1) is longer than a length of the driving device unit in the vehicle width direction (maximum length L2), and
the at least one pair of first mounting portions and the at least one second mounting portion are disposed in the front-rear direction with the driving device unit interposed therebetween.

According to (3), since the length of the driving device unit in the front-rear direction is longer than the length in the vehicle width direction, a stress acting on the electrical connection portion due to rolling of the vehicle can be alleviated, and with respect to pitching of the vehicle, vibration can be suppressed by the mounting portions.

(4) In the vehicle according to any one of (1) to (3),
the joining portion substantially coincides with a center line (center line CL) of the vehicle in the vehicle width direction.

According to (4), the stress acting on the electrical connection portion in association with a vehicle behavior can be reduced.

(5) In the vehicle according to any one of (1) to (4),
the frame member has a rectangular shape so as to surround the driving device unit,
the electrical connection portion is positioned above a virtual line (virtual line P1) connecting the at least one pair of first mounting portions and the at least one second mounting portion in a side view, and
the driving device unit is provided below a floor panel (floor panel 2).

According to (5), since the driving device unit is covered with the floor panel, and the electrical connection portion is positioned above the virtual line, the electrical connection portion can be protected from splashing water, flying stones, or the like.

(6) In the vehicle according to any one of (1) to (5),
the electrical connection portion is provided inside the driving device unit.

According to (6), since the electrical connection portion is not exposed to the outside of the driving device unit, the electrical connection portion can be protected from splashing water, flying stones, or the like.

The invention claimed is:

1. A vehicle comprising:
a driving device unit;
a frame member supporting the driving device unit;
at least one pair of first mounting portions provided on the frame member and positioned on one side of the driving device unit; and
at least one second mounting portion provided on the frame member and positioned on the other side of the driving device unit,
wherein the driving device unit includes:
a drive device accommodating therein an electric motor, and
an electric motor control device configured to control the electric motor,
wherein the drive device and the electric motor control device are arranged side by side in a horizontal direction,
wherein an electrical connection portion electrically connecting the drive device and the electric motor control device is disposed at a joining portion between the drive device and electric motor control device and inside a virtual polygon connecting the at least one pair of first mounting portions and the at least one second mounting portion, and wherein the electrical connection portion is disposed at a position substantially coinciding with a center of gravity of the virtual polygon.

2. The vehicle according to claim 1,
wherein the drive device and the electric motor control device are arranged in a vehicle width direction,
wherein a length of the driving device unit in a front-rear direction is longer than a length of the driving device unit in the vehicle width direction, and
wherein the at least one pair of first mounting portions and the at least one second mounting portion are disposed in the front-rear direction with the driving device unit interposed therebetween.

3. The vehicle according to claim 1,
wherein the joining portion is disposed at a position substantially coinciding with a center line of the vehicle in the vehicle width direction.

4. The vehicle according to claim 1,
wherein the frame member has a rectangular shape so as to surround the driving device unit,
wherein the electrical connection portion is positioned above a virtual line connecting the at least one pair of first mounting portions and the at least one second mounting portion in a side view, and
wherein the driving device unit is provided below a floor panel.

5. The vehicle according to claim 1,
wherein the electrical connection portion is provided inside the driving device unit.

\* \* \* \* \*